Sept. 18, 1945.　　　　L. A. TARBOX　　　　2,385,238
FILTRATION
Filed April 29, 1942
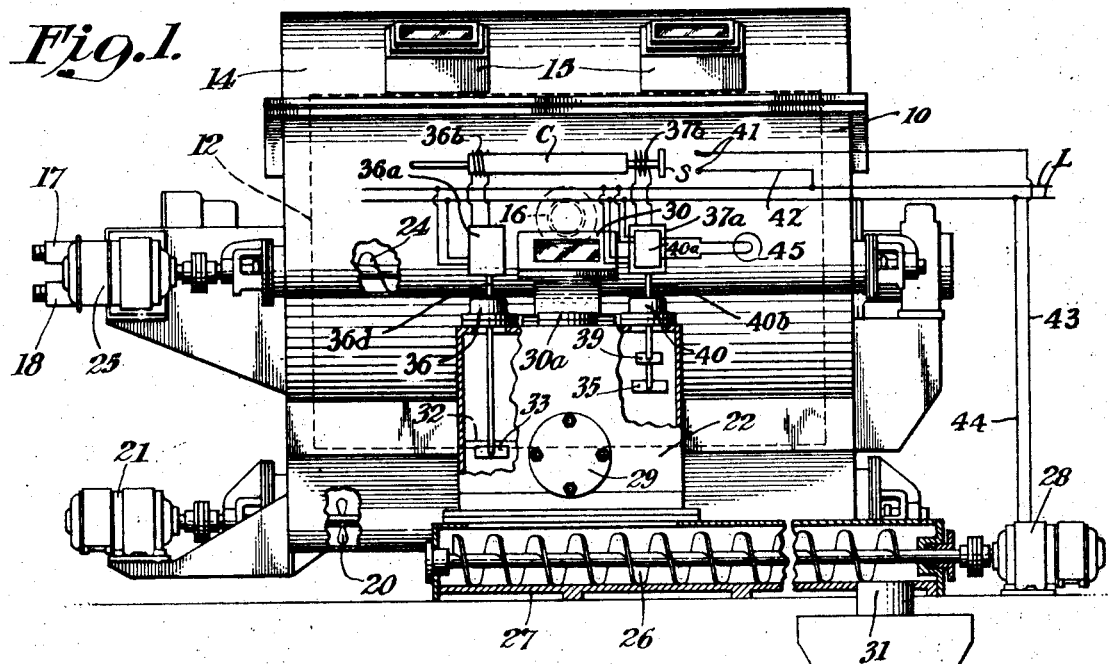
Fig. 1.
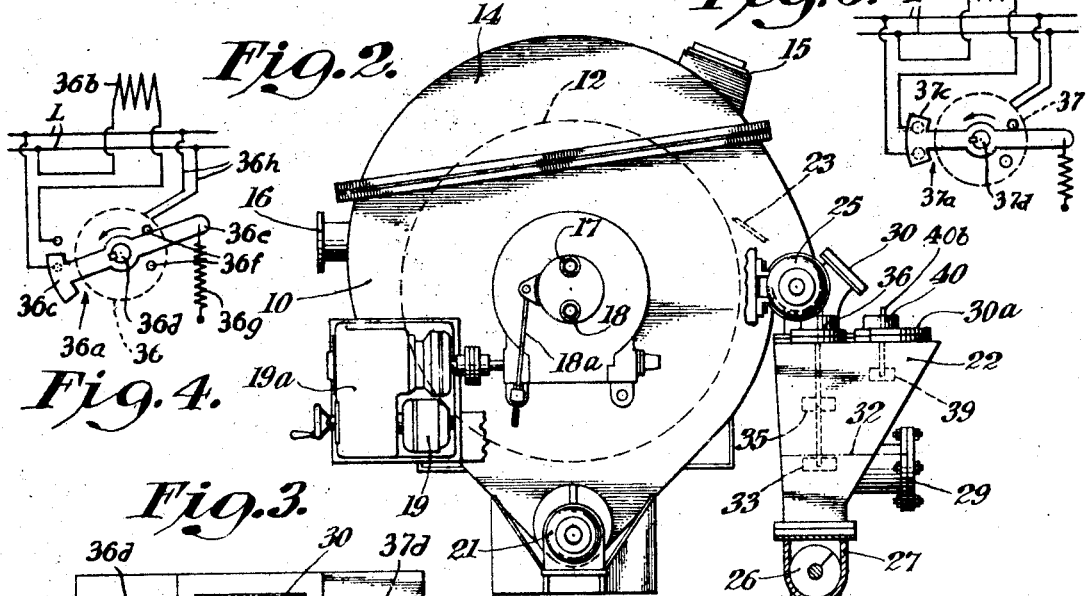
Fig. 2.   Fig. 5.
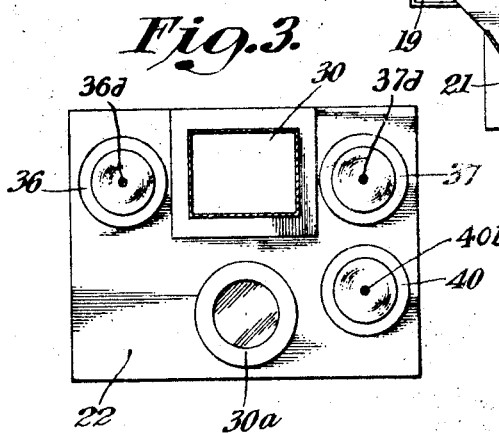
Fig. 4.
Fig. 3.
INVENTOR
Leon A. Tarbox
BY Nathaniel Ely
ATTORNEY Patented Sept. 18, 1945

2,385,238

UNITED STATES PATENT OFFICE 2,385,238

FILTRATION

Leon A. Tarbox, Cranford, N. J., assignor to The Lummus Company, New York, N. Y., a corporation of Delaware Application April 29, 1942, Serial No. 440,943

3 Claims. (Cl. 210—201)

This invention relates to improvements in the art of filtration and more particularly relates to an improved method and means for sealing a filter to permit the continuous filtration of hydrocarbons or similar materials from clay and other earthy materials under a gaseous atmosphere.

Many filtration operations are preferably carried out in the presence of a gaseous atmosphere, which may be under subatmospheric or superatmospheric pressure. With continuous closed filters, the filter medium is passed through a suitable tank of slurry and the liquid forced through the filter medium due to a suitable pressure differential, thereby forming a filter cake which is separately removed from the filter medium and discharged.

When a gaseous surrounding medium is used, it is frequently necessary to prevent either its loss when pressure conditions exist or its contamination when vacuum conditions exist. It is necessary, however, to continuously discharge the filter cake, and the customary gas seals have either been of a complicated mechanical nature with serious fluctuations in the pressure, or, where the filter cake is passed through a liquid seal, there is frequently contamination or other objectionable effect.

The principal object of my invention is to provide an improved method of sealing a continuous filter and permitting the continuous discharge of filter cake without change of gas pressure by providing a minimum length of path of cake through which the vapors could pass, such path causing a pressure drop substantially equal to the differential in pressure, thereby reducing the vapor loss to a minimum.

A more specific object of my invention is to provide an improved sealed discharge hopper for a continuous filter, from which a granular cake discharge is continuously and regularly removed by a screw, which is operated in a manner to maintain a minimum level of filter cake based upon the prior determination of the pressure drop through such material and the differential of pressure at which the filter is operated.

A further object of the invention is to maintain a pressure-tight seal for a conveyor passing between two zones of different gaseous character or pressure which will not interfere with the movement of a granular material between the zones and which will reduce the transfer of the higher pressure media to a minimum.

Further objects and advantages of my invention will appear from the following description of a preferred form of embodiment thereof taken in connection with the attached drawing illustrative thereof, and in which Fig. 1 is a side elevation with parts in section of a continuous closed chamber filter;

Fig. 2 is an end elevation of the filter shown in Fig. 1;

Fig. 3 is a top plan view of the filter discharge chamber;

Fig. 4 is a diagrammatic plan view of one of the switch devices for controlling operation of the discharge conveyor motor; and Fig. 5 is a diagrammatic plan view of another one of the switch devices for controlling operation of the conveyor motor.

In accordance with a preferred form of embodiment of my invention, the filter 10 consists of a principal housing in which is mounted a rotary filter medium indicated by the dotted lines 12, which may be of the disc or drum type. The filter housing 10 is provided with a removable cover 14, which may be provided with inspection ports 15.

As is well known in the art, slurry is introduced to the filter as through the nozzle 16, such slurry filling the lower part of the chamber to a desired height so that the pressure differential which is applied to the filter medium will cause a penetration of the liquid and the formation of the desired filter cake. Suitable ports 17 and 18 are provided for the purposes of removing the filtrate and, for the desired cycle of operation, the port housing is usually adjustable as by screw 18a. Inasmuch as this is a well-known construction, no further explanation of the cycle of operations and the arrangement of the valve ports is thought necessary. It is to be noted that the filter medium, however, is driven by a suitable motor 19 as through a gear reducer 19a, and considering the view Fig. 2, the filter medium rotates in a clockwise direction. If desired, the slurry tank may have an agitator 20 operated by motor 21 to prevent settling in the bottom.

Adjacent the filter and integrally built onto the filter casing is a hopper 22 having a downwardly and inwardly inclined wall. The hopper defines a chamber which is adapted to receive the filter cake as it is removed from the filter surface by the knife or other cake removal means 23, which in turn discharges it to the scrolls 24 and forces the filter cake to the hopper located substantially intermediate the ends of the filter. Scrolls 24 are suitably operated as by motor 25.

The hopper 22 is preferably provided with a discharge screw 26 closely embraced within the conveyor housing 27, such screw being driven as by a motor 28. It will be noted in Fig. 1 that the upper portion of the housing 27 is open through the region of the bottom of the discharge hopper 22 so that the filter cake may build up in this hopper and drop directly onto the screw. A manhole 29 may be provided for cleaning purposes. Observation ports 30 and 30a may also be provided with suitable windows for inspection during operation.

In the filtration of hydrocarbon oils such as lubricating oil after a decolorizing operation, which may be carried out in the presence of a suitable adsorbent material such as clay, it is usually found desirable to maintain an inert atmosphere on the filter to avoid oxidation inasmuch as the oil may be at a temperature of the order of 475° F. In such case, I prefer to use flue gas, which is maintained at the desired pressure. The loss of such gas is highly objectionable because of the economic loss, such gas being usually generated and passed through the filter casing and a heater in a closed circuit.

I find that I am able to prevent the loss of such gas in a highly satisfactory and simplified manner by maintaining a minimum level of cake between the inner zone of the filter cake receiving chamber which is subjected to the superatmospheric pressure, and the opening 31 in the end of the discharge conveyor, which is customarily at atmospheric pressure. The clay, or other material, is usually of a granular nature and may be of a relatively fine mesh and contains as much as 50% oil, although it is considered to be dry. Such cake has a definite resistance to vapor flow, which can be readily determined, and, by establishing a minimum vapor path between the high pressure zone and the low pressure zone, I can obtain a pressure drop for small flow velocities substantially equal to the pressure differential so that there is no material movement of the vapors or gases. For the pressures found effective in this filtering operation, a minimum cake level, as indicated at 32, is found satisfactory. It will be appreciated, however, that for different pressures, a different level may be required, such level also being a function of the density of packing of the material.

To maintain at least a minimum level of cake and to prevent choking the hopper, I find it desirable to use suitable detectors, which may be interconnected in an appropriate electric circuit with the discharge conveyor driving motor 28. Although various electrical and mechanical arrangements may be provided for this purpose, I find it especially satisfactory to provide two paddles 33 and 35, which may be driven by suitable electric motors indicated at 36 and 37 respectively. The longer paddle 33 is normally prevented from rotation by the clay at the minimum level 32. If the conveyor, however, draws off the clay more rapidly than introduced so that the level of the clay drops below the paddle, the rotation of the paddle 33 will, through means described hereinafter, cause the conveyor motor 28 to stop.

The shorter paddle 35 will normally rotate and will only be engaged by filter clay and prevented from rotation when the clay fills up during the period that the conveyor 26 is stopped. At such time, the paddle 35 having stopped, the conveyor motor 28 is started by means described hereinafter. In such manner, it will be possible to maintain a level at least as high as the line 32, and thus prevent loss of gas pressure. For safety purposes, however, it may be desirable to provide a supplementary warning detector, such as the paddle 39, operated by the motor unit 40 for extraordinary conditions. In practice, I provide approximately a forty-minute interval between the operation of the high level and low level control, and one minute between the high level and emergency control. Contact of clay with the warning signal is ordinarily due only to arching of the cake, which requires impact on the hopper 22 to dislodge the cake.

Fig. 1 includes illustration of conventional means which may be employed to control operation of the conveyor motor 28 in response to rotation of the paddle 33 and stalling of the paddle 35. It will be understood, however, that any other suitable means may be employed. Electrical means are, in the present instance, disclosed for said purpose. The motors 36 and 37 are operatively connected to switch devices 36a and 37a respectively. These devices are diagrammatically shown and they may be of any suitable well-known type. Circuit connections lead from line wires L to the switch device 36a, and the latter has circuit connections with a solenoid coil 36b. Switch device 37a has circuit connections with the line wires L and also has circuit connections with a solenoid coil 37b. A core C is operable through both of the said coils and bears a switch member S operable into and out of contact with a pair of contacts 41 by shifting of the core. One of said contacts has a circuit connection 42 with one of the line wires, and the other contact has a circuit connection 43 with the conveyor motor 28. The latter has a circuit connection 44 with the other line wire.

When the level of the cake falls sufficiently to free the paddle 33 the motor 36 is permitted to operate the switch device 36a and said device closes the circuit of the solenoid coil 36b. Thereby, the core C is shifted to the left, with reference to Fig. 1, and the switch element S is moved to break the circuit of motor 28 and stop the conveyor 26. The level of the cake then rises until the cake engages the paddle 35 and stalls it. Thereupon, the switch device 37a closes the circuit of the solenoid coil 37b to effect shifting of the core C to the right, the circuit of the coil 36b having been opened by the switch device 36a in response to stalling of the paddle 33. Movement of the core C and the switch S to the right closes the circuit of the motor 28 and causes operation of the conveyor 26.

Motor 40, which operates the uppermost paddle 39, is operatively connected, through a shaft 40b, to a switch device 40a similar to the device 37b and having circuit connections with the line wires L. Upon stalling of the paddle 39 and its motor 40 the device 40a closes the circuit of a signal which, in the present instance, is a lamp 45.

The switch devices 36a, 37a and 40a may be of any suitable type. As shown in Fig. 4, the device 36a includes a switch blade 36c affixed to a shaft 36d which is in turn affixed to the stator of the motor 36. The stator is mounted for limited rotation so that when the paddle shaft is stalled the stator will be rotated by reaction in a direction reverse to that of the normal rotation of the paddle wheel shaft. Such rotation of the stator causes the shaft 36d to rotate and move the switch into a position to open the circuit of the solenoid coil 36b and thereby permit operation of the conveyor motor 28 in the manner previously described herein. The shaft 36d has a radial arm 36e affixed thereto and engageable with fixed stops 36f spaced to limit back-and-forth rotation of the stator. Arm 36e has a spring 36g connected thereto for rotating the stator to a normal position when the paddle shaft is freed for rotation. During the time that the paddle shaft is stalled the motor 36 is also stalled. The motor 36 is preferably one of certain well-known types of synchronous motors which permit stalling of the motor without damage thereto through overheating. Switch devices of the general type just described are well known in the electrical field and have been employed in other connections. No claim is made to the switch device per se in the present application and it is therefore considered unnecessary to illustrate it in greater detail. The motor 36 is supplied with current from the line wires L through conductors 36h. These conductors are omitted from the electrical diagram of Fig. 1 in order to simplify the illustration.

As shown in Fig. 5, the switch device 37a is similar in general to the device 36a except that the switch blade 37c is so disposed on the stator shaft 37d as to close the circuit of the solenoid coil 37b when the paddle shaft of the motor 37 is stalled and the stator is rotated. Thereby, closure of the circuit of the conveyor motor is effected as previously described herein. Shaft 37d also has a stop arm affixed thereto and engageable with fixed stops to limit back-and-forth rotation of the stator, and a spring connected to said arm to rotate the stator to normal position when the paddle shaft is freed and thereby move the switch blade to open-circuit position.

The switch device 40a may be similar to the devices 36a and 37a and includes a stator shaft 40b for operating the switch blade. Of course, the electrical system indicated will be provided with the requisite rectifiers, cut-out switches, etc. These are omitted in the drawing in order to simplify the illustration.

The cake discharge is substantially continuous and regular except for possible occasional stoppage, during which additional reserve of cake is built up for the gas seal. With such an arrangement, the pressure within the filter casing is maintained uniform and with no substantial leakage. Filtration operations can, therefore, be carried out in a continuous, regular and satisfactory manner.

The control of a pressure chamber by maintaining a minimum length of material through which the gases must pass so that vapor losses are minimum is also applicable to other types of granular conveyors as, for example, in the discharge or introduction of granular catalysts to reaction and revivification zones. As heretofore described, it is desirable either to maintain the zone in consideration at a pressure which differs from the surrounding zone or under a gas which it is desired to prevent from escaping or which it is desired to be kept free of contamination. In a catalytic reaction zone, for example, introduction of air might cause explosive mixtures and loss of the products of reaction would be economically wasteful. Similarly, with catalytic revivification operations, it is highly undesirable that there be a transfer of gas from one zone to another. In a similar manner, it can be determined as to the minimum path through which the gases must travel through the granular material, and for the differential of pressure, it can be determined what minimum length is necessary to prevent substantial loss of pressure. Having determined such minimum level, the aforementioned apparatus is particularly applicable to maintain such level within the desired limits. A desired pressure condition within the filter chamber may be established by means (not shown) connected either to the nozzle 16 or to a nozzle 46 borne by the cover 14.

While I have shown and described a preferred form of embodiment of my invention, I am aware that modifications may be made thereto, and I, therefore, desire a broad interpretation of my invention within the scope and spirit of the description herein and of the claims appended hereinafter.

I claim:

1. In combination with a filter and a housing therefor to segregate the filter from an external region of different pressure, means forming a filter cake receiving chamber communicating with the interior of said housing to receive a discharge of filter cake of granular material from the filter and constrain said received material to form a packed mass, said chamber having an outlet at its under side, conveyor means for propelling the material from said outlet to the said external region, a motor for operating said conveyor means; and control means for said conveyor motor, comprising a paddle mounted for rotation within said chamber at a level spaced above said outlet and a control motor operatively connected to said paddle to drive it, said control motor being adapted, when running, to cause deenergization of the conveyor motor and being adapted, when stalled by engagement of the material as the level thereof rises, to stop the control motor, the paddle being at a level predetermined with reference to a required difference in gaseous conditions between the filter housing and the external region for control of the conveyor operation to maintain a sufficient depth of the granular material above said outlet to seal the latter for maintenance of said difference in conditions.

2. In combination with a continuous rotary filter and a housing therefor to segregate the filter from an external region of different pressure, means forming a filter cake receiving chamber communicating with the interior of said housing to receive a continuous discharge of filter cake of granular material from the filter and constrain said received material to form a packed mass, said chamber having an outlet at its under side, conveyor means for propelling the material from said outlet to the said external region, a motor for operating said conveyor means; and control means for said conveyor motor, comprising a pair of paddles mounted for rotation within said chamber at different levels above said outlet and a pair of control motors operatively connected to said paddles respectively to drive them individually, the motor for the lower paddle being adapted, when running, to cause deenergization of the conveyor motor, the motor for the upper paddle being adapted, when idle, to cause energization of the conveyor motor and each paddle being adapted, when stalled by engagement of the material as the level thereof rises, to stop its respective motor, the lower paddle being at a level predetermined with reference to a required pressure differential between the filter housing and the external region for control of the conveyor operation to maintain a sufficient depth of the granular material above said outlet to seal the latter for maintenance of said differential.

3. In combination with a filter and a housing therefor to segregate the filter from an external region of different pressure, means forming a filter cake receiving chamber communicating with the interior of said housing to receive a discharge of filter cake of granular material and constrain said received material to form a gravity-packed mass, means for discharging said material from said chamber at a low point thereof and into said external region, and means responsive to fluctuations in the level of the material in the chamber to control discharge of the material from the chamber and maintain within the chamber, above said discharge point, a depth of the material sufficient to form thereof a seal for preventing material exchange of gas between the interior of said housing and said external region and thereby maintain a desired gaseous condition within the housing.

LEON A. TARBOX.